(12) United States Patent
Bradfield et al.

(10) Patent No.: US 7,759,838 B2
(45) Date of Patent: Jul. 20, 2010

(54) COIL SUPPORT FOR ROTATING ELECTRICAL MACHINE

(75) Inventors: Michael D. Bradfield, Anderson, IN (US); Brad L. Auler, Muncie, IN (US); Samuel R. Edrington, Noblesville, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 0 days.

(21) Appl. No.: 12/235,017

(22) Filed: Sep. 22, 2008

(65) Prior Publication Data

US 2010/0072838 A1 Mar. 25, 2010

(51) Int. Cl.
*H02K 9/19* (2006.01)

(52) U.S. Cl. .......................... 310/263; 310/194; 310/52

(58) Field of Classification Search .................. 310/263, 310/194, 52, 58, 59, 64
See application file for complete search history.

(56) References Cited

U.S. PATENT DOCUMENTS

| 3,643,119 | A | * | 2/1972 | Lukens | 310/60 R |
| 3,863,127 | A | * | 1/1975 | Raver | 320/123 |
| 4,221,982 | A | * | 9/1980 | Raver et al. | 310/59 |
| 4,739,204 | A | * | 4/1988 | Kitamura et al. | 310/68 D |
| 4,955,944 | A | * | 9/1990 | Aso et al. | 123/41.31 |
| 5,097,169 | A | * | 3/1992 | Fukushima | 310/263 |
| 5,160,864 | A | * | 11/1992 | Saito | 310/54 |

* cited by examiner

*Primary Examiner*—Dang D Le
(74) *Attorney, Agent, or Firm*—Cantor Colburn LLP

(57) ABSTRACT

Disclosed is a coil support for an electrical machine including a shank having a first outer diameter configured to support a field coil of the electrical machine and a base located at one end of the shank. The base has a second outer diameter greater than the first outer diameter and includes a plurality of recesses configured to increase a cooling flow through the electrical machine. Further disclosed is an electrical machine including the coil support and a method for cooling an electrical machine.

22 Claims, 3 Drawing Sheets

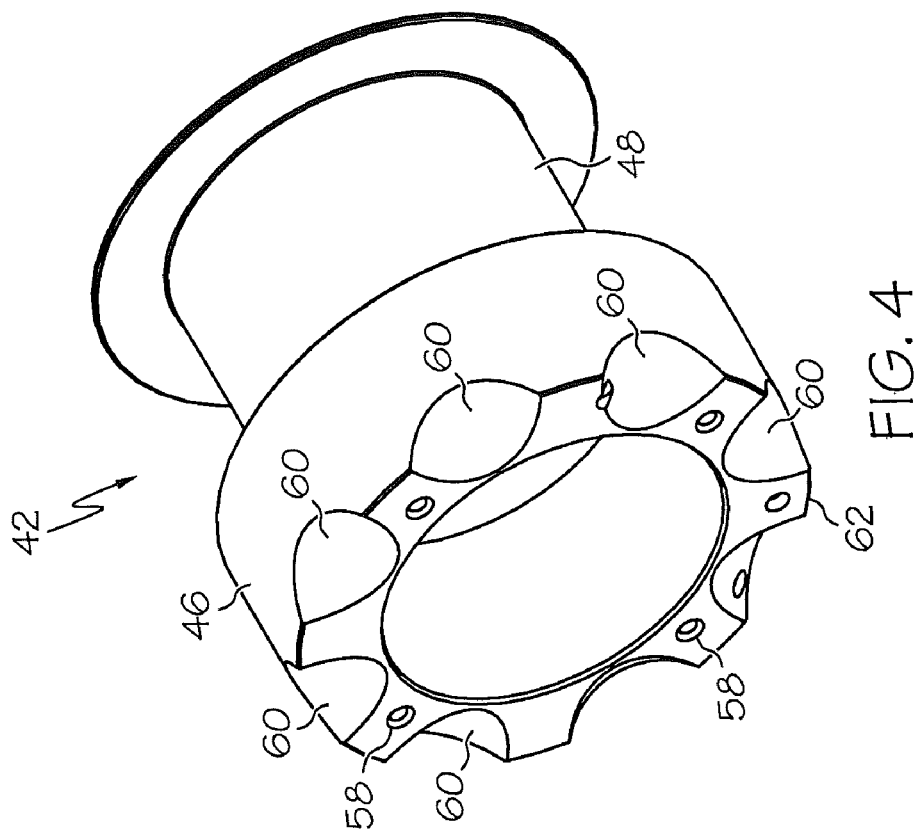
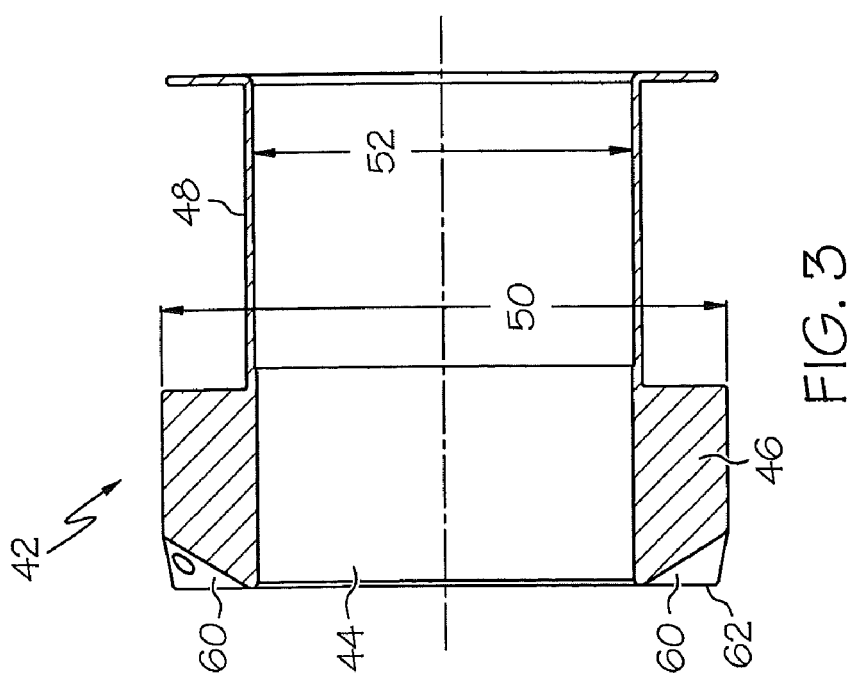

COIL SUPPORT FOR ROTATING ELECTRICAL MACHINE

BACKGROUND

This disclosure relates generally to electrical machines. More specifically, this disclosure relates to a winding support for a rotating electrical machine.

Rotating electrical machines, for example, alternators, rely on airflow through the alternator to control the temperature of internal components of the alternator. Air is typically drawn into the machine through air flow openings in the rear of the machine by a centrifugal fan located at the front of the machine. A base of a typical field coil support is located near a back wall of the machine. So, to be effective, the air flow openings are typically located radially outboard of the field coil support so that the openings are not blocked. With an increase in size of the field coil, and the support to accommodate it, to provide increased power from an electrical machine in a given size package, it is increasingly difficult to provide air flow openings of sufficient area to provide needed cooling air to internal components of the electrical machine. Further, the size and placement of necessary electronics packages, such as a diode rectifier and a voltage regulator, at the back of the machine additionally inhibit provision of adequate cooling air.

SUMMARY

A coil support for an electrical machine includes a shank having a first outer diameter configured to support a field coil of the electrical machine and a base located at one end of the shank. The base has a second outer diameter greater than the first outer diameter and includes a plurality of recesses configured to increase a cooling flow through the electrical machine.

An electrical machine includes a housing having a plurality of cooling flow openings at at least a first end of the housing. A field coil support is located in the housing about a central axis of the electrical machine. The field coil support includes a shank having a first outer diameter configured to support a field coil of the electrical machine and a base positioned at one end of the shank. The base has a second outer diameter greater than the first outer diameter and includes a plurality of recesses configured to increase a cooling flow through the electrical machine.

A method for cooling an electrical machine includes urging a cooling flow into the electrical machine through a plurality of cooling flow openings located at a first end of a housing. The cooling flow is flowed across a plurality of recesses located in a base of a coil support, the base positioned adjacent to the first end of the housing. Components of the electrical machine are cooled via the cooling flow.

DESCRIPTION OF THE DRAWINGS

The above, as well as other advantages of the present invention, will become readily apparent to those skilled in the art from the following detailed description when considered in light of the accompanying drawings in which:

FIG. 3 is a cross-sectional view of an embodiment of a field coil support of the electrical machine of claim 1; and FIG. 4 is a perspective view of the field coil support of FIG. 3.

DETAILED DESCRIPTION

Figure 1:
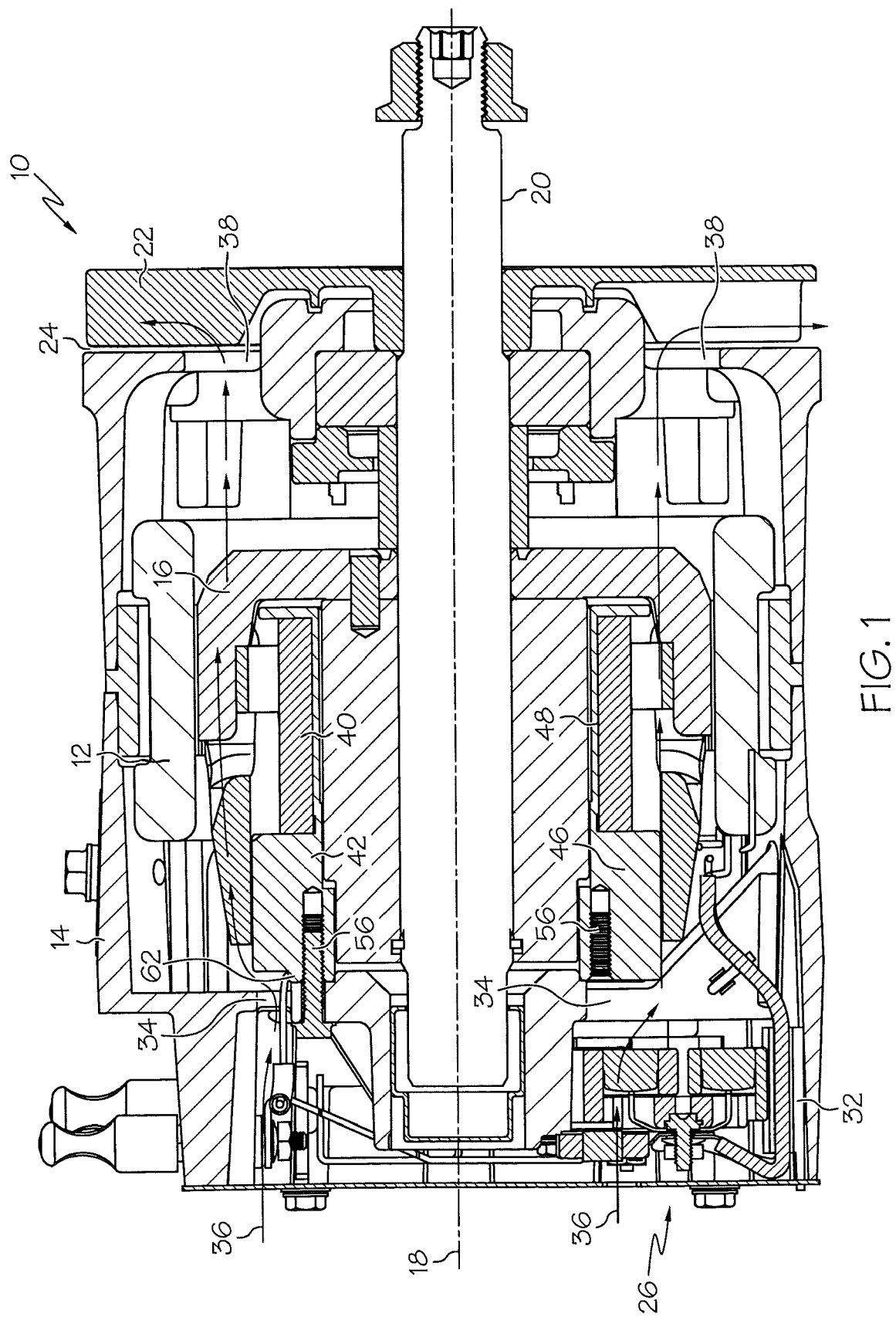
FIG. 1 is a cross-sectional view of an embodiment of an electrical machine.
Figure 2:
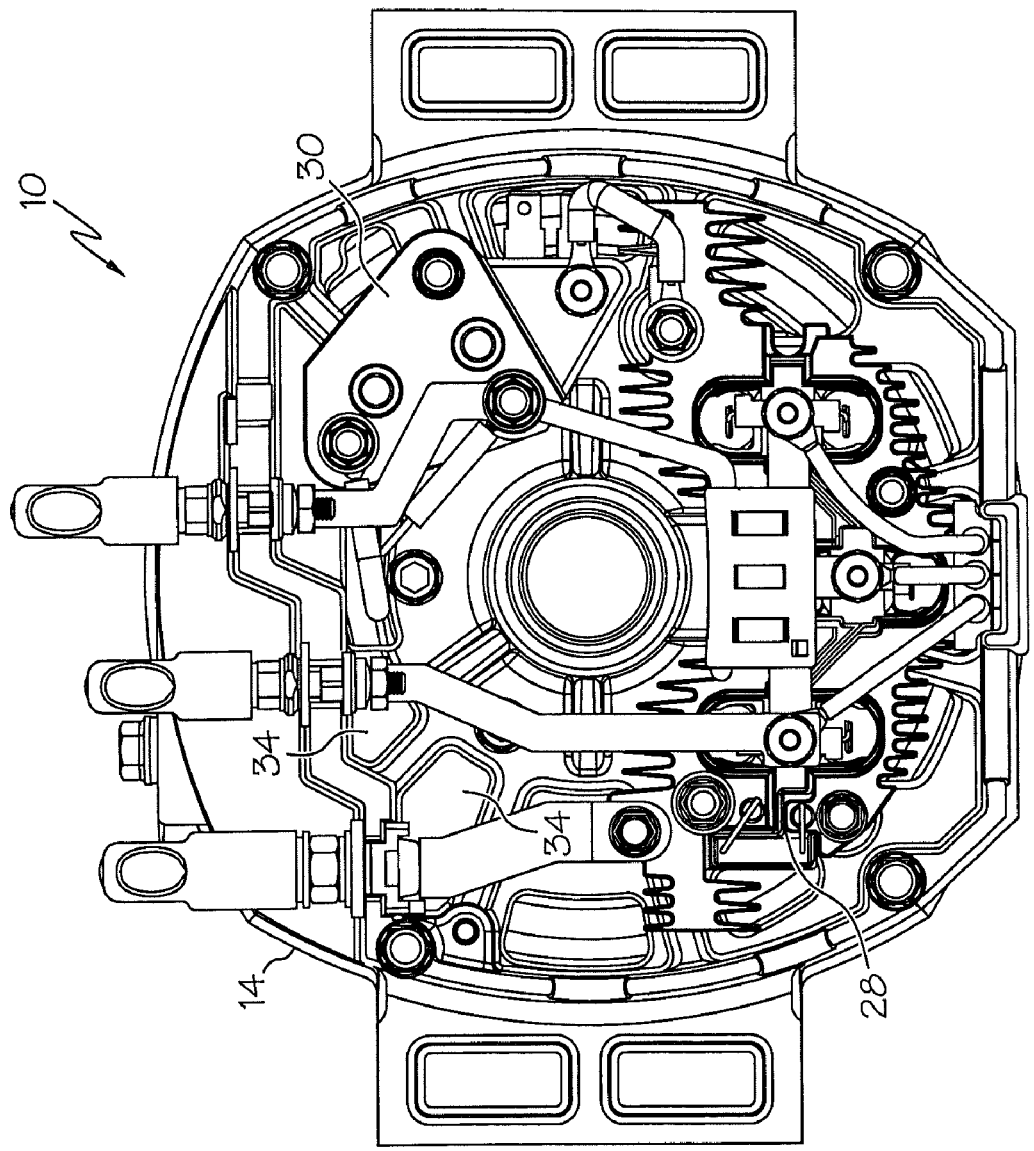
FIG. 2 is an end view of an embodiment of an electrical machine.

Shown in FIG. 1 is an embodiment of an electrical machine, for example and alternator 10. In some embodiments, the alternator 10 is a brushless alternator. The alternator 10 includes a stator 12 disposed in a housing 14. A rotor 16 is disposed inboard of the stator 12 and is rotatable about a central axis 18 of the alternator 10 by a rotor shaft 20 disposed at the central axis 18. A fan 22, located at a fan end 24 of the alternator 10, typically outside of the housing 14, is likewise rotatable about the central axis 18 via the rotor shaft 20. An electronics package 26, including, in some embodiments, a diode rectifier 28 and a voltage regulator 30, as best shown in FIG. 2, disposed at an electronics end 32 of the alternator 10. The electronics package 26 in this embodiment is disposed outside of the housing 14, but it is to be appreciated that other embodiments where the electronics package 26 is disposed within the housing 14 are contemplated within the present scope.

The housing 14 includes a plurality of airflow apertures 34 disposed at the electronics end 32 of the alternator 10. The airflow apertures 34 allow cooling flow 36 to enter the alternator 10 to cool internal components of the alternator 10, including the rotor 16 and the stator 12, to lengthen the service life of those components, compared to uncooled components. A plurality of airflow exits 38 are disposed in the housing 14 at the fan end 24 of the alternator 10. As the fan 22 rotates with the rotor shaft 20, cooling flow 36 is drawn into the airflow apertures 34 and through the alternator 10, exiting the housing 14 via the airflow exits 38.

The rotor 16 rotates about the central axis 18 outboard of a stationary field coil 40 supported by a stationary field coil support 42. As shown in FIG. 3, the field coil support 42 is a substantially annular structure, the rotor shaft 20 insertable through a support opening 44. The field coil support 42 includes a support base 46 disposed at the electronics end 32 and a support shank 48 extending from the support base 46 toward the fan end 24. The support base 46 has a base outer diameter 50 which is substantially greater than a shank outer diameter 52 of the support shank 48. As shown in FIG. 1, the field coil 40 is disposed at the support shank 48 as a plurality of conductive windings 54 wrapped around the support shank 48.

Referring again to FIG. 1, in some embodiments, the field coil support 42 is secured to the housing 14 at the electronics end 32 by one or more mechanical fasteners 56, for example, bolts or screws. As shown in FIG. 4, the field coil support 42 includes a plurality of fastener holes 58 in the support base 46 into which the one or more mechanical fasteners 56 are insertable via corresponding housing holes (not shown) to secure the field coil support 42 to the housing 14. It is to be appreciated, however, that the field coil support 42 may be secured to the housing 14 by other means, for example, welding or adhesive.

To increase the capacity for cooling flow 36 to enter the alternator 10 through the airflow apertures 34, the support base 46 includes a plurality of concave recesses 60 to reduce an area of the support base 46 end face 62 which abuts the electronics end 32 of the housing 14. In some embodiments, the plurality of recesses 60 are disposed such that each recess 60 is substantially aligned radially with at least a portion of an airflow aperture 34. Aligning the recesses 60 with the airflow apertures 34 reduces an area of the end face 62 abutting the electronics end 32. This allows for an increase in size of the airflow apertures 34 in a direction extending toward the central axis 18, thereby increasing the volume of cooling flow 36 into the airflow apertures 34 and through the alternator 10 to cool the alternator 10 components.

The recesses 60 shown in FIG. 4 are substantially concave scallops with a constant radius of curvature, but it is to be appreciated that recesses of other shapes such as, for example, straight chamfers or notches, are contemplated within the present scope. In the embodiment of FIG. 4, each fastener hole 58 is disposed at the end face 62 between adjacent recesses 60.

Utilizing the plurality of recesses 60 enables the field coil support 42 to have an increased size to accommodate a larger field coil 40 to enable an increased output of the alternator 10 while still providing an adequate cooling flow 36 to lengthen the service life of internal components of the alternator 10.

While embodiments of the invention have been described above, it will be understood that those skilled in the art, both now and in the future, may make various improvements and enhancements which fall within the scope of the claims which follow. These claims should be construed to maintain the proper protection for the invention first described.

What is claimed is:

1. A coil support for an electrical machine comprising:
   a shank having a first outer diameter and configured to support a field coil of the electrical machine; and
   a base disposed at one axial end of the shank and extending substantially axially in one direction therefrom, the base having a second outer diameter greater than the first outer diameter, the base including a plurality of recesses configured to increase a cooling flow into the electrical machine.

2. The coil support of claim 1 wherein the plurality of recesses are configured to be adjacent to a plurality of cooling flow openings in a housing of the electrical machine.

3. The coil support of claim 1 including at least one fastener hole configured to secure the coil support in the electrical machine.

4. The coil support of claim 3 wherein each fastener hole of the at least one fastener hole is disposed between adjacent recesses of the plurality of recesses.

5. The coil support of claim 1 wherein each recess of the plurality of recesses is a concave shape having a substantially constant radius.

6. The coil support of claim 1 wherein the electrical machine is a brushless alternator.

7. The coil support of claim 1 wherein the cooling flow is air.

8. An electrical machine comprising:
   a housing including a plurality of cooling flow openings at at least a first end of the housing;
   a field coil support disposed in the housing about a central axis of the electrical machine and including:
   a shank having a first outer diameter and configured to support a field coil of the electrical machine; and
   a base disposed at one axial end of the shank and extending substantially axially in one direction therefrom, the base having a second outer diameter greater than the first outer diameter, the base including a plurality of recesses configured to increase a cooling flow into the electrical machine.

9. The electrical machine of claim 8 wherein each recess of the plurality of recesses aligns with a cooling flow opening of the plurality of cooling flow openings.

10. The electrical machine of claim 8 including a rotatable fan at a second end of the housing.

11. The electrical machine of claim 10 wherein the cooling flow is urged into the electrical machine through the cooling flow openings via rotation of the fan.

12. The electrical machine of claim 8 wherein the field coil support is secured to the housing at the first end of the electrical machine.

13. The electrical machine of claim 12 wherein the field coil support is secured to the housing by at least one mechanical fastener.

14. The electrical machine of claim 13 wherein the field coil support includes at least one fastener hole to secure the coil support in the electrical machine.

15. The electrical machine of claim 14 wherein each fastener hole of the at least one fastener hole is disposed between adjacent recesses of the plurality of recesses.

16. The electrical machine of claim 8 wherein each recess of the plurality of recesses is a concave shape having a substantially constant radius.

17. The electrical machine of claim 8 wherein the electrical machine is a brushless alternator.

18. The electrical machine of claim 8 wherein the cooling flow is air.

19. A method for cooling an electrical machine comprising:
   urging a cooling flow into the electrical machine through a plurality of cooling flow openings disposed at a first end of a housing;
   supporting a field coil of the electrical machine via a field coil support including:
   a shank having a first outer diameter supportive of the field coil; and
   a base disposed at an axial end of the shank and extending substantially axially in one direction therefrom;
   flowing the cooling flow across a plurality of recesses disposed in the base configured to increase a cooling flow into the electrical machine, the base disposed adjacent to the first end of the housing; and
   cooling components of the electrical machine via the cooling flow.

20. The method of claim 19 wherein the cooling flow is urged into the electrical machine by a fan disposed at a second end of the housing.

21. The method of claim 19 including urging the cooling flow across an electronics package disposed at the first end of the housing.

22. The method of claim 19 wherein the electrical machine is a brushless alternator.

* * * * *